United States Patent
Pankratz et al.

(10) Patent No.: US 9,615,407 B2
(45) Date of Patent: Apr. 4, 2017

(54) DEVICE FOR INDUCTIVELY HEATING A HEATING ELEMENT

(71) Applicant: Behr-Hella Thermocontrol GmbH, Lippstadt (DE)

(72) Inventors: Harri Pankratz, Soest (DE); Hans-Joachim Thiemann, Bueren (DE)

(73) Assignee: Behr-Hella Thermocontrol GmbH, Lippstadt (DE)

(*) Notice: Subject to any disclaimer, the term of this patent is extended or adjusted under 35 U.S.C. 154(b) by 216 days.

(21) Appl. No.: 14/536,081

(22) Filed: Nov. 7, 2014

(65) Prior Publication Data
US 2015/0060439 A1  Mar. 5, 2015

Related U.S. Application Data

(63) Continuation of application No. PCT/EP2013/059640, filed on May 8, 2013.

(30) Foreign Application Priority Data

May 10, 2012 (DE) ........................ 10 2012 207 847

(51) Int. Cl.
  *H05B 6/06* (2006.01)
  *H05B 6/10* (2006.01)

(52) U.S. Cl.
  CPC .............. *H05B 6/06* (2013.01); *H05B 6/105* (2013.01); *H05B 2213/07* (2013.01)

(58) Field of Classification Search
  CPC .......... H05B 6/06; H05B 6/105; H05B 6/062; H05B 6/02; H05B 2213/07
  See application file for complete search history.

(56) References Cited

U.S. PATENT DOCUMENTS

| | | | |
|---|---|---|---|
| 4,996,405 A | 2/1991 | Poumey et al. | |
| 5,255,981 A | 10/1993 | Schiessle et al. | |
| 8,415,594 B2 | 4/2013 | Schilling et al. | |
| (Continued) | | | |

FOREIGN PATENT DOCUMENTS

| | | |
|---|---|---|
| CN | 101485231 A | 7/2009 |
| CN | 102186271 A | 9/2011 |
| (Continued) | | |

OTHER PUBLICATIONS

Third Party Observations for European Patent No. 13721750.1 with partial English translation.
(Continued)

*Primary Examiner* — Brian Jennison
(74) *Attorney, Agent, or Firm* — Muncy, Geissler, Olds & Lowe, P.C.

(57) ABSTRACT

A device and method is provided for inductively heating a heating element, particularly via a magnetic field generated by an induction coil, having an induction coil connected to a resonant circuit, whereby the resonant circuit has at least one first capacitor and at least one first current source, and the coil has a specific inductance and a resistance, and the material of the heating element has a constant permeability at least in temperature subranges, and a method for determining a temperature of a heating element.

7 Claims, 2 Drawing Sheets

(56) References Cited

U.S. PATENT DOCUMENTS

2009/0314769 A1* 12/2009 Bonnel .................. H05B 3/746
219/627
2011/0120989 A1* 5/2011 Schilling ................ H05B 6/062
219/661

FOREIGN PATENT DOCUMENTS

| DE | 42 38 862 C2 | 2/1997 |
| DE | 195 40 408 A1 | 5/1997 |
| DE | 197 14 701 A1 | 10/1998 |
| DE | 10 2005 050 038 A1 | 5/2007 |
| DE | 10 2009 047 185 A1 | 6/2011 |
| JP | H 10-183326 A | 7/1998 |
| JP | 3937918 B2 | 6/2007 |

OTHER PUBLICATIONS

Chinese Office Action for Chinese Application No. 201380023681.7 dated Sep. 17, 2015 with English translation.

* cited by examiner

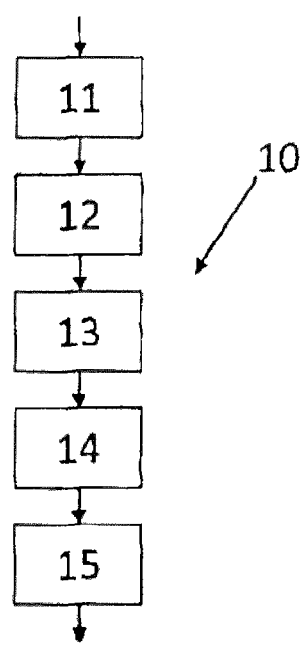

DEVICE FOR INDUCTIVELY HEATING A HEATING ELEMENT

This nonprovisional application is a continuation of International Application No. PCT/EP2013/059640, which was filed on May 8, 2013, and which claims priority to German Patent Application No. DE 10 2012 207 847.9, which was filed in Germany on May 10, 2012, and which are both herein incorporated by reference.

BACKGROUND OF THE INVENTION

Field of the Invention

The present invention relates to a device for inductively heating a heating element via a magnetic field generated by an induction coil, having an induction coil connected to a resonant circuit, and to a method for determining a temperature of a heating element.

Description of the Background Art

Electrically conductive materials can be heated by induction. This occurs by placing an electrically conductive material in a magnetic field generated by an induction coil. The magnetic field is hereby generated by an alternating current, which results in a polarity reversal of the magnetic field at the frequency of the alternating current.

Eddy currents are induced in the electrically conductive material by the alternating magnetic field. These induced alternating currents work against the specific resistance of the material, as a result of which heat is produced.

The induction can occur in this case through nonconductive materials, which experience no heating. Only the radiation of heat from the electrically conductive material can lead to a heating of the surrounding nonconductive materials.

Heating by induction can be found in many applications today. The most frequent industrial uses are, for instance, the tempering, annealing, melting, or welding of metals. But induction heating can be found in household appliances as well, for instance, in induction cooktops.

Induction heating is used furthermore also for heating fluids that flow around a heating element. Induction heating is especially suitable for use in water circulation systems in electric vehicles, because electrical energy can be converted to heat with a relatively high efficiency. This is especially advantageous, because in electric vehicles no waste heat arises from the internal combustion engine and therefore cannot be utilized for heating, for instance, the passenger compartment.

In order to be able to regulate selectively the emitted heat output of an induction heating system and to be able to ensure that the induction heating system is not overheated, it is necessary to be able to accurately determine the temperature of the heating element being heated inductively. Various methods are known from the prior art.

For example, the temperature of an object can be acquired by temperature sensors. These can be placed either directly on the object or be attached to the object in conjunction with a thermal bridge. These temperature sensors work, for instance, by the principle of the temperature-dependent change in the resistance of the sensor. To this end, however, the sensor or the thermal bridge would be used as an additional part, incurring costs and taking up additional installation space.

In addition, also known are optical temperature measuring devices that determine a temperature contactless by means of optical methods. In order to be able to use optical methods, the region to be measured must be visible and in the best case also be accessible. This is not possible everywhere, however.

The determination of the temperature of a heating element heated by induction also occurs, moreover, by methods utilizing the temperature-dependent permeability properties of a material. This is disclosed in, for example, DE 42 38 862 C2, which corresponds to U.S. Pat. No. 5,255,981.

It is a particular disadvantage of this method that it cannot be used for materials that have a constant permeability for the temperature range of interest in the specific application, as a result of which the material selection is limited, or the method can be used only in special material/temperature range combinations.

In the case of all methods in the prior art, additional components are required for performing a temperature measurement or the to be measured site provides sufficient access.

SUMMARY OF THE INVENTION

It is therefore an object of the present invention to provide a device for inductively heating a heating element and a method for determining the temperature of a heating element of an induction heating system, which permits the temperature of the heating element to be determined in a simple and cost-effective manner, without additional components and without the need to access the heating element.

In an embodiment, a device is provided for inductively heating a heating element, particularly by means of a magnetic field generated by an induction coil, having an induction coil connected to a resonant circuit, whereby the resonant circuit has at least one first capacitor and at least one first current source, and the coil has a specific inductance and a resistance, and the material of the heating element has a constant permeability at least in temperature subranges.

The resonant circuit can be operated with alternating current. In this way, a magnetic field forms which repolarizes with the frequency of the alternating current and by which alternating currents are induced in the heating element.

The capacitor can be connected in series with the current source and the induction coil.

The material of the heating element can have a temperature-dependent electrical conductivity. The resistance of the material can be calculated via the electrical conductivity, since the resistance and conductivity are inversely proportional. It is necessary for the method of the invention that the heating element has a temperature-dependent resistance.

In an embodiment, the resonant circuit can have at least one first measuring device for determining the resonance frequency of the resonant circuit and/or has a second measuring device for determining the power consumption of the resonant circuit.

The device can have at least one third measuring device for measuring the temperature-dependent resistance of the heating element, whereby the temperature of the heating element can be determined from the resistance.

The temperature of the heating element can finally be derived from the resistance of the heating element.

The temperature-dependent resistance of the heating element can be determined, particularly calculated, whereby the temperature of the heating element can be determined from the resistance.

For determining the temperature of a heating element, the inductance of the induction coil can be acquired via the resonance frequency of the resonant circuit and/or the resistance of the induction coil can be determined via the power consumption of the resonant circuit.

Furthermore, the temperature of the heating element can be determined from the inductance and/or resistance of the induction coil.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows a flowchart explaining the individual process steps of an exemplary embodiment.

DETAILED DESCRIPTION

Figure 1:
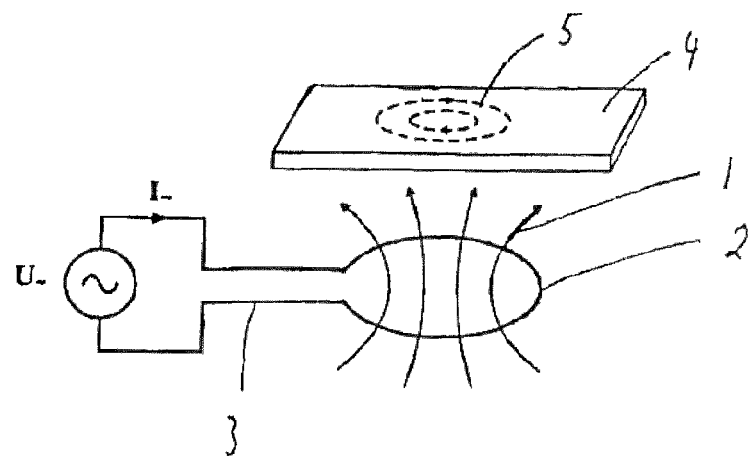
FIG. 1 shows a schematic structure of an induction heating system.

FIG. 1 shows the basic structure of an induction heating system. Shown is induction coil 2, which is connected to a resonant circuit 3, operated with an alternating voltage. A magnetic field 1 is generated in induction coil 2 by the alternating voltage in resonant circuit 3. Because of the alternating current applied to resonant circuit 3, magnetic field 1 is an alternating magnetic field that changes its magnetic orientation with the frequency of the alternating current.

A heating element 4, comprising an electrically conductive material, is introduced into magnetic field 1. Eddy currents 5 are induced in heating element 4 due to magnetic field 1. Because eddy currents 5 work against the specific resistance of heating element 4, heat is produced in heating element 4.

It follows that material which comprises heating element 4 must have a certain specific internal resistance to enable an effective heating of heating element 4. The lower the internal resistance of the material, the lower the heating effect.

In an embodiment of the invention, material 4 has a constant permeability within the temperature range relevant for induction heating, whereby it becomes possible to use temperature measuring methods based on a permeability that varies as a function of temperature.

Heating element 4 must be arranged at a such distance to induction coil 2 that it is still located within the forming magnetic field. Other elements made of electrically nonconductive materials can be arranged between heating element 4 and induction coil 2.

Induction heating systems are constructed according to this simple principle. Heating element 4 in alternative embodiments can also have different external dimensions and shapes. Thus, in principle, any regular or also irregular arrangement of material of heating element 4 is conceivable.

Figure 2:
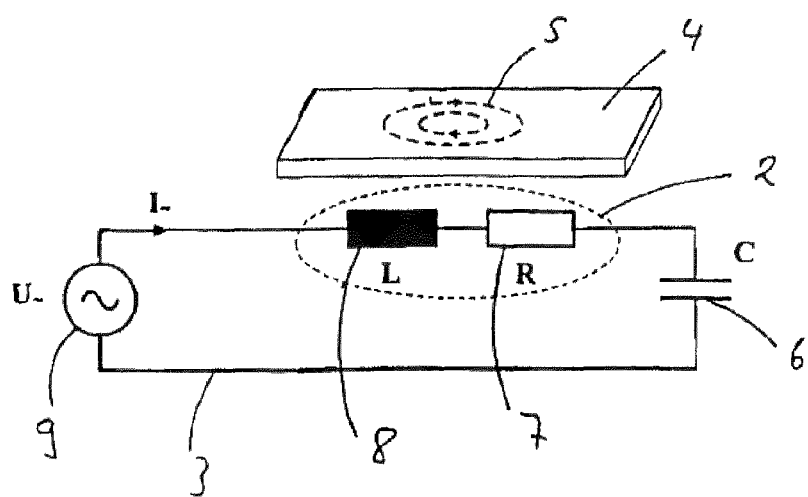
FIG. 2 shows a detailed illustration of the current circuit, connected to the induction coil generating the magnetic field.

FIG. 2 shows a detailed view of resonant circuit 3. A capacitor 6 is integrated into resonant circuit 3 next to voltage source 9 and induction coil 2. Capacitor 6 is connected in series with induction coil 2 and voltage source 9.

Induction coil 2 has an internal resistance 7 and an inductance 8. These two variables can be determined in resonant circuit 3 shown in FIG. 2 via the measurement of the power consumption of resonant circuit 3 or the measurement of the resonance frequency of resonant circuit 3.

In this case, in particular, inductance 8 can be determined via the measurement of the resonance frequency of resonant circuit 3 and internal resistance 7 from the power consumption of resonant circuit 3.

Not shown in FIG. 2 is the internal resistance of heating element 4. In an embodiment of the invention, this depends on the temperature of heating element 4. The resistance of the material is linked directly inversely proportional with the conductivity of the material. The resistance thereby corresponds to the reciprocal value of the electrical conductivity.

Because the strength and distribution of eddy currents 5 in heating element 4 depend to a great extent on the internal resistance or the conductivity of heating element 4, it follows as a logical consequence that the change in the resistance affects the eddy currents 5 because of the changing temperature. Therefore the strength and distribution of eddy currents 5 are likewise temperature-dependent.

The induced eddy currents 5 for their part influence magnetic field 1 of induction coil 2 and hereby change the electrical properties of induction coil 2.

These changes in the electrical properties relate to the internal resistance 7 and inductance 8 of induction coil 2. A conclusion can thereby be reached from the change in these two variables on the change in the electrical resistance of heating element 4 and thereby on its temperature.

A direct link can be established between the variables: inductance 8, internal resistance 7 of induction coil 2, and the temperature-dependent resistance or conductivity of heating element 4. As a result, direct information can be obtained on the temperature of heating element 4 from the determination of inductance 8 and/or internal resistance 7 of induction coil 2.

At a sufficiently high temperature dependence of the resistance or the conductivity of heating element 4, it is possible to determine the temperature of heating element 4 from only one of the two variables: inductance 8 or resistance 7 of induction coil 2.

FIG. 3 shows a flowchart 10 to clarify the method for determining the temperature of a heating element 4, whereby in block 11 the resonance frequency of resonant circuit 3 is measured. This can be accomplished, for example, by means of a frequency counter. In block 12, the power consumption of resonant circuit 3 is then measured.

The inductance 8 of induction coil 2 can now be determined with the value, determined in block 11, for the resonance frequency. This occurs in block 13.

In block 14, resistance 7 of induction coil 2 is determined from the power consumption of resonant circuit 3, measured in block 12.

In block 15, the temperature of the heating element is now determined from inductance 8 and/or from resistance 7 of induction coil 2.

This procedure is based on the fact that the formation of eddy currents 5 in heating element 4 changes because of a change in the temperature-dependent resistance of heating element 4. Eddy currents 5 for their part have an effect on magnetic field 1 which in turn directly influences the electrical properties of induction coil 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for inductively heating a heating element via a magnetic field, the device comprising:
    an induction coil generating the magnetic field, the induction coil having a specific inductance and resistance; and
    a resonant circuit connectable to the induction coil, the resonant circuit having at least one first capacitor and at least one first current source,
    wherein a material of the heating element has a substantially constant permeability at least in temperature subranges,
    wherein the resonant circuit has at least one first measuring device for determining a resonance frequency of the resonant circuit and has a second measuring device for determining a power consumption of the resonant circuit, wherein the inductance of the induction coil is determined via the resonance frequency and the resistance of the induction coil is determined via the power consumption, and
    wherein the device has at least one third measuring device for determining a temperature-dependent resistance of the heatinq element based on the inductance and the resistance of the induction coil, and wherein the temperature of the heating element is determined from the temperature-dependent resistance.

2. The device according to claim 1, wherein the resonant circuit is operated with alternating current.

3. The device according to claim 1, wherein the capacitor is connected in series with the current source and the induction coil.

4. The device according to claim 1, wherein the material of the heating element has a temperature-dependent electrical conductivity.

5. A method for determining the temperature of a heating element via the device according to claim 1, the method comprising:
    determining a resonance frequency of the resonant circuit;
    determining a power consumption of the resonant circuit;
    determining the inductance of the induction coil via the resonance frequency;
    determining the resistance of the induction coil via the power consumption; and
    determining a temperature-dependent resistance of the heating element based on the inductance and the resistance of the induction coil; and
    determining the temperature of the heating element from the temperature-dependent resistance.

6. The device according to claim 1, wherein the at least one third measuring device determines the temperature-dependent resistance of the heating element based solely on the inductance and the resistance of the induction coil, such that the temperature of the heating element, being determined from the temperature-dependent resistance, is based solely on the inductance and the resistance of the induction coil.

7. The method according to claim 5, wherein the determining of the temperature-dependent resistance of the heating element is based solely on the inductance and the resistance of the induction coil, such that the temperature of the heating element, being determined from the temperature-dependent resistance, is based solely on the inductance and the resistance of the induction coil.

* * * * *